United States Patent [19]
Billman et al.

[11] 3,817,622
[45] June 18, 1974

[54] MEASUREMENT OF PLASMA TEMPERATURE AND DENSITY USING RADIATION ABSORPTION

[75] Inventors: Kenneth W. Billman; Paul D. Rowley, both of Mountain View; James R. Stallcop, Palo Alto; Leroy L. Presley, Los Altos, all of Calif.

[73] Assignee: The United States of America as represented by the Administrator of the National Aeronautics and Space Administration, Washington, D.C.

[22] Filed: Dec. 26, 1972

[21] Appl. No.: 318,151

[52] U.S. Cl. ............... 356/73, 356/43, 356/85, 356/87, 356/201
[51] Int. Cl. ..................... G01n 21/00, G01n 3/30
[58] Field of Search ............ 356/72, 73, 75, 85, 87, 356/88, 43, 201, 93; 250/220

[56] References Cited
UNITED STATES PATENTS

| | | | |
|---|---|---|---|
| 2,527,122 | 10/1950 | Heigl et al. | 356/75 |
| 3,588,253 | 6/1971 | Wittmann | 356/93 |
| 3,622,243 | 11/1971 | Wada | 356/75 |
| 3,654,109 | 4/1972 | Hohl et al. | 356/85 |
| 3,676,004 | 7/1972 | Prugger et al. | 356/87 |
| 3,734,620 | 5/1973 | Cade | 356/73 |

*Primary Examiner*—Ronald L. Wibert
*Assistant Examiner*—V. P. McGraw
*Attorney, Agent, or Firm*—Darrell G. Brekke; Armand G. Morin, Sr.; John R. Manning

[57] ABSTRACT

A light beam of predetermined wavelength, preferably monochromatic, is directed through a plasma to be measured. The absorption of the light by the plasma is detected for deriving an absorption coefficient of the plasma. Knowing the absorption coefficient of the plasma and independently measuring either the electron density or temperature of the plasma allows solution of an equation to derive the other unknown quantity, i.e. either electron density or temperature. In a preferred method, the absorption coefficient of the plasma is derived simultaneously for two probing light beams of substantially different predetermined wavelengths. Knowing these two coefficients allows solution of two simultaneous equations to derive the electron density and temperature of the plasma.

7 Claims, 4 Drawing Figures

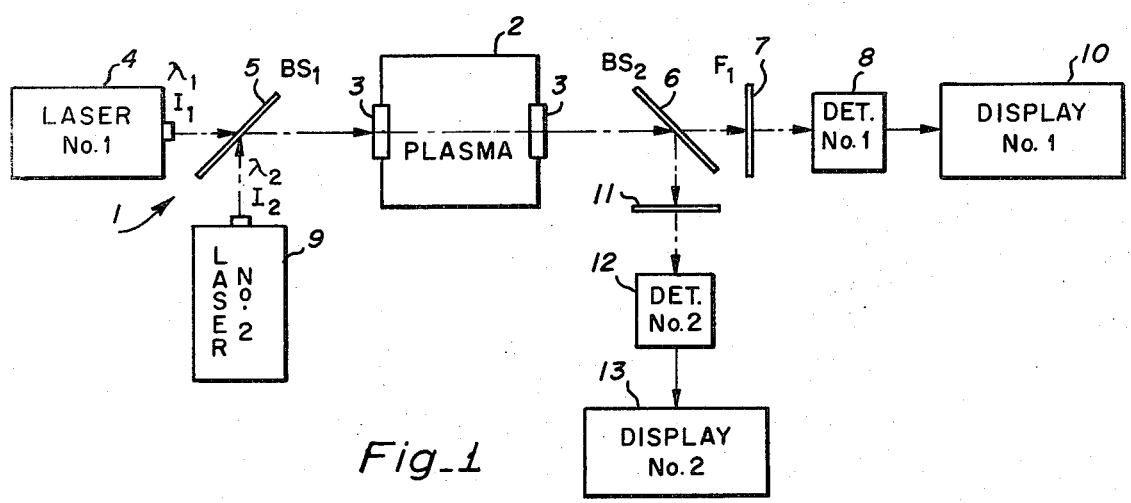
Fig_1
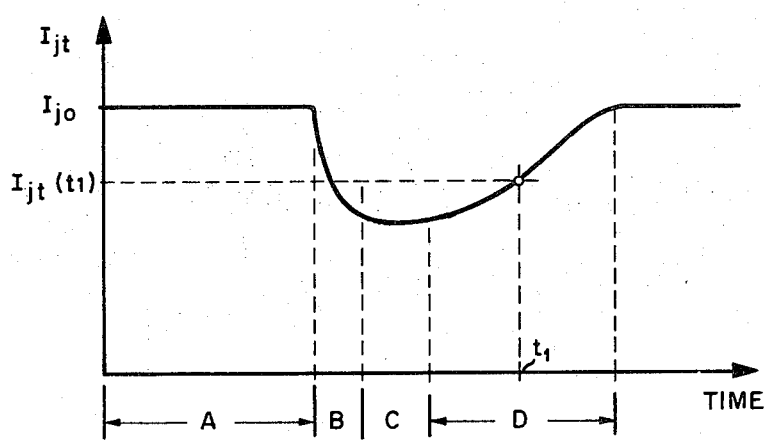
Fig_2

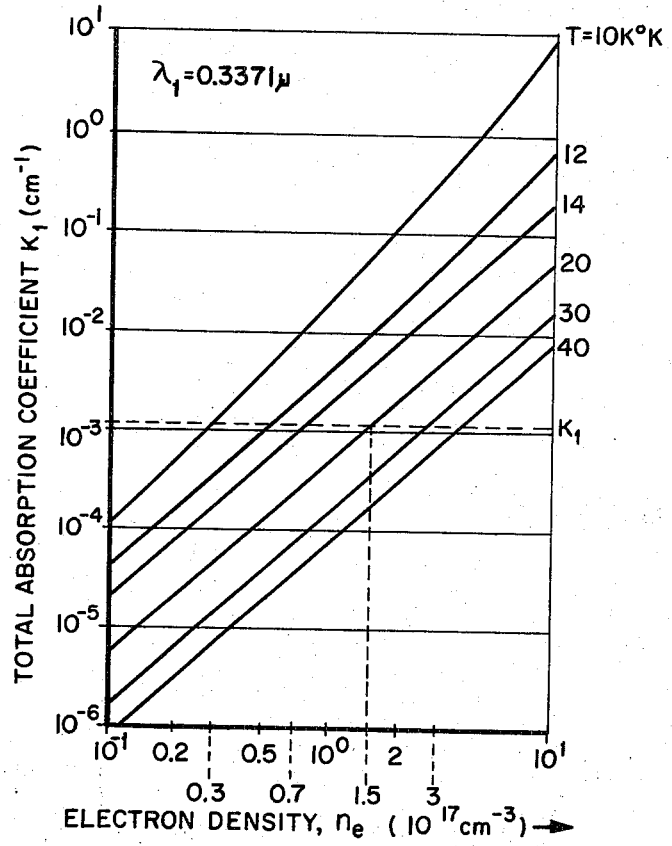
*Fig_3*
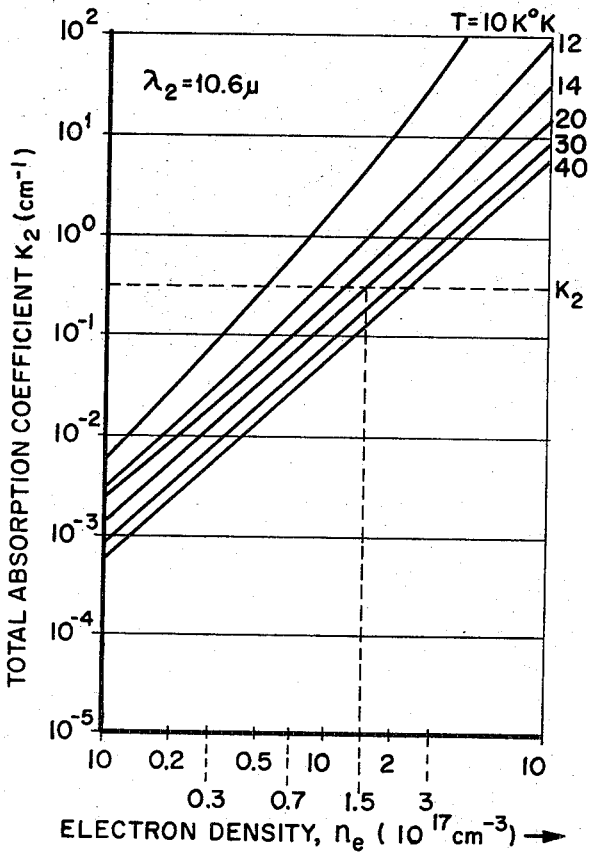
*Fig_4*

MEASUREMENT OF PLASMA TEMPERATURE AND DENSITY USING RADIATION ABSORPTION

GOVERNMENT RIGHTS

The invention described herein was made by employees of the United States Government and may be manufactured and used by or for the Government for governmental purposes without the payment of any royalty thereon or therefor.

BACKGROUND OF THE INVENTION

Heretofore, the measurement of the temperature and electron density of a plasma has at best been a difficult task. It has been pursued, in general, by spectroscopic techniques. These techniques fall into three general categories: line broadening measurements, spectral intensity measurements, and index of refraction measurements.

In the line broadening measurements, the intensity, as a function of wavelength, of a spectral line of an element is employed. A measurement of the half width of a line $\Delta\lambda$ is related to two broadening mechanisms: Stark broadening and Doppler broadening. Stark broadening is a function of the local ionization in the plasma, and hence is a measure of the electron density. Doppler broadening is a function of the ionic motion, and hence is related to the plasma temperature. Using the $H_\beta$ ($\lambda = 4,861$ Å) line of hydrogen, Stark measurements with an estimated accuracy of 10 percent are possible in plasmas which can be "seeded" with hydrogen. The broadening is large for high density, low temperature plasmas ($\Delta\lambda$ approximately equal to 30 Å for electron densities $n_e = 5 \times 10^{17}$ centimeters $^{-3}$). However, Doppler broadening, in general, never exceeds one angstrom and thus temperature determination by this method is poor.

In spectral intensity measurements, the intensity of the continuum radiation from a plasma is measured and associated with the black body radiation theory to obtain the plasma temperature. In fact, a slope determination, i.e., measurement of the intensity of two spectral bands separated in wavelength and taking the ratio, is sufficient to obtain a temperature. Similarly, discrete spectral line intensities can be used to obtain temperature. In general, one must have an optically thin plasma and local thermodynamic equilibrium (LTE). The measurement of the plasma density is more difficult, but it too can be obtained by spectral measurement. In an optically thin plasma, a measurement of the absolute intensity of a spectral line with knowledge of the atomic transition probability and the plasma dimensions are sufficient to determine the population density of the upper level of the observed transition. If the plasma is in local thermodynamic equilibrium and the electron temperature has been measured by some means, then Saha's equation and charge neutrality can be used to get the electron density.

An alternative method for measuring the electron density of a plasma is by the use of a laser interferometer. In this measurement the change in electron density may be accurately determined simply by counting interference fringes.

The difficulty with most of the aforecited methods is that they are laborious experimental techniques. The use of photography is only one of the reasons. It is necessary to measure line profiles accurately taking into account the film fog, background radiation, non-linear sensitivity of the film, overlapping higher order lines, etc. The film and spectrometer must be intensity calibrated. When looking at Doppler broadening (less than one angstrom), higher dispersive spectrometers must be utilized. Even when using ratio techniques, such as the continuum slope method, extensive preliminary work must be done to be sure that no spectral lines fall into the bandpass of the two monochrometers being used. Another difficulty with the Doppler technique is its sensitivity to magnetic fields in the plasma since Zeeman splitting can add to the linewidth.

In general these prior methods can yield temperature measurements of 10 percent accuracy and plasma density measurements of 15 percent accuracy; however, this is with extensive care and laborious techniques.

SUMMARY OF THE PRESENT INVENTION

The principal object of the present invention is the provision of an improved method and apparatus for determining the temperature and/or electron density of a plasma.

In one feature of the present invention, the absorption of light of a predetermined wavelength by the plasma is employed to derive the absorption coefficient of the plasma for the predetermined wavelength. The additional measurement of electron density or temperature by one of the aforecited techniques allows solving for the other parameter, i.e. electron density or temperature.

In another feature of the present invention, substantially simultaneous measurements are made of the absorption of probing light by the plasma at first short wavelength $\lambda_1$ and second long wavelength $\lambda_2$ to derive the absorption coefficients of the plasma for light of the predetermined first and second wavelengths. The two absorption coefficients are then utilized for graphically solving two simultaneous equations for temperature T and electron density $n_e$ of the plasma. These equations have the approximate functional form:

$$K_1 = C_1 \lambda_1^3 T^{-1/2} n_e^2 \exp(hc/\lambda_1 kT) g(\lambda_1, T) \qquad 1$$

$$K_2 = C_2 \lambda_2^2 T^{-3/2} n_e^2 g(\lambda_2, T) \qquad 2$$

where $C_1$ and $C_2$ are known constants, $h$ is Planck's constant, $c$ is the velocity of light, $k$ is Boltzmann's constant, and $g$ is a slowly varying function of $\lambda$ and $T$.

In another feature of the present invention, a pair of laser light beams at substantially different wavelengths are combined by a beam splitting mirror and directed through the plasma to a second beam splitting mirror which separates the two wavelengths and feeds each through a respective filter to a respective detector and oscilloscope in order to obtain simultaneous measurements of the absorption of the probing light as a function of time, during which the plasma is excited and extinguished.

Other features and advantages of the present invention will become apparent upon a perusal of the following specification taken in connection with the accompanying drawings wherein:

BRIEF DESCRIPTION OF THE DRAWINGS

FIG. 1 is a schematic block diagram of a typical apparatus for determining electron density and temperature of a plasma incorporating features of the present invention, FIG. 2 is a plot of detected transmitted light intensity versus time as detected by the oscilloscope detectors of FIG. 1.

FIG. 3 is a plot of the total absorption coefficient $K_1$ for a typical short wavelength probe ($\lambda_2 = 0.3371\ \mu$), and FIG. 4 is a plot of the total absorption coefficient $K_2$ for a typical long wavelength probe ($\lambda_2 = 10.6\ \mu$).

DESCRIPTION OF THE PREFERRED EMBODIMENTS

Referring now to FIG. 1, there is shown a plasma measuring apparatus 1 incorporating features of the present invention. The apparatus 1 includes a chamber 2 for containing the plasma to be measured. A pair of optically transparent windows 3 are provided in opposite sides of the chamber 2 to allow passage of a beam of light through the plasma within the chamber 2.

A first light source 4, such as a laser, directs its output monochromatic light beam of wavelength $\lambda_1$ and light intensity $I_1$ through a beam splitting mirror 5, window 3, plasma, output window 3 and thence through a second beam splitting mirror 6 and optical filter 7 to an optical detector 8.

The detector 8 includes a sensor such as a photocell for sensing the intensity of the light beam incident thereon and the detected signal is fed to an oscilloscope 10 for recording or display of the sensed light intensity as a function of time. Filter 7 is a narrow band optical filter for passing wavelength $\lambda_1$ and excluding other light.

A second narrow band light source 9, such as a laser, produces a monochromatic output beam of wavelength $\lambda_2$ and of an intensity $I_2$. The wavelength $\lambda_2$ of the second laser 9 is preferably substantially different from the wavelength $\lambda_1$ of the first light source 4. More particularly, in a typical example light source 4 comprises a nitrogen laser having an output wavelength $\lambda_1$ of 0.3371 microns, whereas the second light source 9 comprises a $CO_2$ laser having an output wavelength $\lambda_2$ of 10.6 microns.

The output light beam of the second laser is directed against the beam splitting mirror 5 and reflected therefrom along a beam path coincident with the first laser beam path to the second beam splitting mirror 6. At the second beam splitting mirror the second light beam is reflected from the second mirror 6 through a second narrow band optical filter 11 to a second light detector 12. Detector 12 includes a light sensing device such as a photocell which senses the light of the second wavelength $\lambda_2$ to produce an electrical signal which is preferably recorded or displayed on display 13 as a function of time. A suitable display device 13 includes an oscilloscope.

The beam splitting mirrors 5 and 6 are preferably dichroic mirrors which transmit radiation of wavelength $\lambda_1$ and reflect radiation of wavelength $\lambda_2$.

In operation, with no plasma present in the chamber 2, the recorded detected light signals would be $I_{10}$ for $\lambda_1$ radiation and $I_{20}$ for $\lambda_2$ radiation. When the plasma is present, however, the radiation is attenuated and smaller transmitted light intensities are recorded: $I_{1t}$ for $\lambda_1$ and $I_{2t}$ for $\lambda_2$. This attenuation can be mathematically described by the equation $I_{jt} = I_{jo}\ e^{-K_j l}$. The values of $j$ are 1 and 2 for $\lambda_1$ and $\lambda_2$, respectively. The absorption path length in the plasma is $l$. $K_j$ is the total absorption coefficient for the plasma which will be shown to be related to the temperature, density, and elemental constituents of the plasma, and to the wavelength of the probe radiation. In general these quantities will vary in time, first as the plasma develops and then as it decays.

One of the virtues of the technique of the present invention is the ability to follow these temporal variations and record them. Thus, a typical oscilloscope trace might look like FIG. 2, where the transmitted intensity for wavelength $j$ is displayed as a function of time. For simplicity, the time axis has been divided into various segments. Interval A is the time when no plasma is present, thus the intensity $I_{jo}$ can be measured from the oscilloscope trace. During the interval B, the plasma is forming, during C it is constant, and during interval D it is decaying back to the no plasma state.

At any time, for example at $t = t_1$, the transmitted intensity $I_{jt}(t_1)$ can be measured. Knowing the absorption length $l$, one can then find $K_j(t_1)$ from:

$$K_j(t) = -(1/l)\ \ln I_{jt}(t_1)\ /\ I_{jo}$$

Two such absorption quantities are found, $K_1(t_1)$ for $\lambda_1$ and $K_2(t_1)$ for $\lambda_2$. These two absorption coefficient quantities can be used to find the plasma density and temperature.

The total absorption coefficient for a typical plasma can be shown to consist of three parts as follows:

$$K = K_{ei} + K_{en} + K_p$$

$K_{ei}$ is the absorption coefficient due to the electron-ion inverse bremsstrahlung (IB). $K_{en}$ is the electron-neutral atom IB coefficient. $K_p$ is the photoionization absorption coefficient. In general each of these terms will depend upon the electron density $n_e$ and temperature T, and the radiation wavelength $\lambda$. Using a long wavelength the IB terms will dominate, i.e., K is approximately equal to $K_{ei} + K_{en}$, while for a short wavelength photoionization will dominate, i.e., K is approximately equal to $K_p$. For simplicity, it has been assumed here that the probe wavelengths are not resonately absorbed in the plasma. If this is not the case the line contribution must be included.

For a measurement of both $n_e$ and T, one method of the present invention utilizes measurements of the absorption coefficient at both wavelengths $\lambda_1$ and $\lambda_2$. For example, the nitrogen laser line $\lambda_1 = 0.3371$ microns and $CO_2$ laser line $\lambda_2 = 10.6$ microns could be employed. Let us assume, as an example, that the measured absorption coefficients for these wavelengths are $K_1 = 1.14 \times 10^{-3}$ cm$^{-1}$ and $K_2 = 3.1 \times 10^{-1}$ cm$^{-1}$. Using the total absorption curves for these two wavelengths, FIG. 3 for $\lambda_1$ and FIG. 4 for $\lambda_2$, a graphical iteration is performed to uniquely determine the temperature and density of the plasma which gives rise to these two absorption coefficients. First the measured values of $K_1$ and $K_2$ are plotted on their respective graphs (shown as horizontal dashed lines). A temperature is arbitrarily chosen on FIG. 3, such as $T = 14$ K°K. This shows an electron density of $n_e = 0.77 \times 10^{17}$ cm$^{-3}$. Using this density, one finds (for $T = 14$ K°K) on FIG. 4, a value of $K_2 = 1.5 \times 10^{-1}$ cm$^{-1}$ which does not agree with the measured $K_2$ value. Thus the assumed (trial) value of temperature was incorrect and another one must be tried. If we assume $T = 20$ K°K we get from FIG. 3 a value of $n_e = 1.5 \times 10^{17}$ cm$^{-3}$ (see the vertical dashed line). If we use this with FIG. 4 (see vertical dashed line) we obtain for $T = 20$ K°K a value of $K_2 = 3.1 \times$ $10^{-1}$ cm$^{-1}$. This value agrees with that measured, and hence the assumed temperature of $T = 20$ K°K and the resultant electron density of $n_e = 1.5 \times 10^{17}$ cm$^{-3}$ are indeed the correct values for the plasma. It should be noted that the total absorption curves can be generated from theory for any wavelength, and that the temperature curves can be plotted on a smaller incremental basis than those shown in this illustrative example. This would allow a more accurate determination of temperature and density.

It should be noted that the optical layout illustrated in FIG. 1 is only one of many configurations which may be used. For example, when examining high density plasmas it may be found that the long wavelength ($\lambda_2$) absorption greatly exceeds the short wavelength ($\lambda_1$) absorption, so that for the same absorption length no transmitted $\lambda_2$ light can be detected. Two solutions to this problem exist: (1) Reduce $\lambda_2$ or (2) change the geometry to make the absorption path of $\lambda_2$ in the plasma be shorter than that for $\lambda_1$. Many ways of accomplishing the latter will be apparent to those familiar with the field of plasma diagnostics. For example, the two laser beams may follow separate paths through the plasma, each beam being directed to its individual detector without the use of beamsplitter 6. If the plasma is of rectangular cross section, $\lambda_1$ can traverse the long dimension while $\lambda_2$ traverses the short dimension.

In an alternative method of the present invention, either $n_e$ or T can be determined individually. That is, if an independent measurement of $n_e$ is made, for example, with a laser interferometer, then a measure of $K_2$ using a long wavelength (e.g. 10.6 microns), will give the corresponding value of T by use of FIG. 4. This is a particularly advantageous method since it can be shown that for the long wavelength IB, the plasma need not be in local thermodynamic equilibrium nor is it necessary to know the chemical constituency of the elements in the plasma. In the alternative, the electron density $n_e$ may be found by making an independent measurement of the temperature T of the plasma and then finding the intercept of this temperature curve and the (horizontal) plot of the measured K value on the total absorption curve. The value of $n_e$ will be that corresponding to this intercept point.

The method and apparatus of the present invention is basically simple and provides a method for measuring both the electron density $n_e$ and temperature T of the plasma as a function of time in the plasma. Previous methods rely on expensive and delicate spectrograms, interferometers, and spectrometers. Such prior methods require careful spectrophotography with its inherent difficulties of fog, linearity, self-reversal, and lack of temporal resolution. Intensity calibration of photographic film, spectrometers, photomultipliers, etc. have heretofore been required.

In the case of the present invention, almost all of the aforedescribed laborious and expensive techniques and equipment are unnecessary. Attenuation measurements are inherently simple. By using lasers of reasonable intensity, the plasma background radiation can be neglected. The plasma is permitted to contain large magnetic fields (approximately 10$^6$ gauss) without affecting the measurement. In certain cases, knowledge of the chemical composition is not necessary. In addition, local thermodynamic equilibrium of the plasma is not required.

What is claimed is:

1. In a method of determining properties of a plasma by radiation absorption, the steps of selecting a first radiation with a wavelength $\lambda_1$ for radiating said plasma wherein the dominant absorption in said plasma will be photoionization, selecting a second radiation with a wavelength $\lambda_2$ for radiating said plasma wherein $\lambda_2$ is longer than $\lambda_1$, and the photoionization absorption in said plasma will be insignificant, directing said first and second radiations into said plasma, detecting the absorption of said first and second radiations to derive first and second absorption coefficients, respectively, and graphically determining from the absorption coefficient plots for said two wavelengths the temperature and electron density of the plasma.

2. The method of claim 1 wherein the second radiation is absorbed by electron-ion inverse bremsstrahlung.

3. The method of claim 1 wherein the second radiation is absorbed by electron-neutral atom inverse bremsstrahlung.

4. The method of claim 1 wherein the second radiation is absorbed by electron-ion inverse bremsstrahlung and electron-neutral atom inverse bremsstrahlung.

5. The method of claim 1 wherein said radiations are other than a resonance line.

6. In a method of determining the electron density of a plasma wherein the temperature is known, the steps of: selecting a radiation with a specific wavelength $\lambda_1$ that will produce a predetermined type of absorption in said plasma; choosing the type of absorption from the group of photoionization, electron-ion inverse bremsstrahlung, and electron-neutral atom inverse bremsstrahlung, directing said radiation on said plasma, detecting the absorption of said radiation at wavelength $\lambda_1$ to derive an absorption coefficient, and graphically determining from the absorption coefficient plot for said wavelength the electron density of said plasma.

7. In a method of determining the temperature of a plasma wherein the electron density is known, the steps of: selecting a radiation with a specific wavelength $\lambda_1$ that will produce a predetermined type of absorption in said plasma; choosing the type of absorption from the group of photoionization, electron-ion inverse bremsstrahlung, or electron-neutral atom inverse bremsstrahlung, directing said radiation on said plasma, detecting the absorption of said radiation at wavelength $\lambda_1$ to derive an absorption coefficient, and graphically determining from the absorption coefficient plot for said wavelength the temperature of said plasma.

* * * * *